United States Patent
Proctor et al.

(10) Patent No.: US 9,496,915 B2
(45) Date of Patent: Nov. 15, 2016

(54) USE OF ORTHOGONAL OR NEAR ORTHOGONAL CODES IN REVERSE LINK

(75) Inventors: James A. Proctor, Indialantic, FL (US); Pertti O. Alapuranen, Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 3 days.

(21) Appl. No.: 13/600,931

(22) Filed: Aug. 31, 2012

(65) Prior Publication Data

US 2012/0320901 A1   Dec. 20, 2012

Related U.S. Application Data

(63) Continuation of application No. 12/433,309, filed on Apr. 30, 2009, now Pat. No. 8,259,744, which is a continuation of application No. 11/152,858, filed on Jun. 14, 2005, now Pat. No. 7,529,264, which is a (Continued)

(51) Int. Cl.
*H04B 7/216* (2006.01)
*H04B 1/707* (2011.01)
(Continued)

(52) U.S. Cl.
CPC ........... *H04B 1/707* (2013.01); *H04J 13/0022* (2013.01); *H04J 13/18* (2013.01); *H04B 1/7077* (2013.01)

(58) Field of Classification Search
CPC ................. H04J 13/0022; H04J 13/18; H04J 2203/0092; H04J 13/19; H04J 13/20; H04J 13/21; H04B 7/2628; H04B 7/2629; H04B 7/263; H04B 7/2631; H04L 5/0007
USPC ............... 370/204, 208, 209, 335, 342, 441; 375/140, 141, 145
See application file for complete search history.

(56) References Cited

U.S. PATENT DOCUMENTS 4,460,992 A   7/1984   Gutleber
5,056,109 A   10/1991  Gilhousen et al.
(Continued)

FOREIGN PATENT DOCUMENTS

EP   0 719 481 B1   10/2001
JP   5-110539       4/1993
(Continued)

OTHER PUBLICATIONS

Lee et al., *CDMA Systems Engineering Handbook*, Artech House, pp. 344-345 (1998).

(Continued)

*Primary Examiner* — Dady Chery
(74) *Attorney, Agent, or Firm* — Volpe and Koenig, P.C.

(57) ABSTRACT

An apparatus and method for use with a shared access communication channel is disclosed. A wireless network device receives signals and recovers data from a first plurality of subscriber units and a second plurality of subscriber units in a time interval. Received signals from the first plurality of subscriber units are distinguishable by having unique pseudo noise (PN) sequence with respect to others of the first plurality of subscriber units. Received signals the second plurality of subscriber units are distinguishable by a unique orthogonal sequence with respect to others of the second plurality of subscriber units. Received signals are distinguished between the first and second plurality of subscriber units based on detection of an orthogonal sequence present only in the received signals from the second plurality of subscriber units.

14 Claims, 3 Drawing Sheets

Related U.S. Application Data continuation of application No. 10/196,569, filed on Jul. 15, 2002, now Pat. No. 6,917,581.

(60) Provisional application No. 60/306,062, filed on Jul. 17, 2001.

(51) Int. Cl.
*H04J 13/00* (2011.01)
*H04J 13/18* (2011.01)
*H04B 1/7077* (2011.01)

(56) References Cited

U.S. PATENT DOCUMENTS

| | | |
|---|---|---|
| 5,101,501 A | 3/1992 | Gilhousen et al. |
| 5,103,459 A | 4/1992 | Gilhousen et al. |
| 5,267,261 A | 11/1993 | Blakeney et al. |
| 5,404,376 A | 4/1995 | Dent |
| 5,414,728 A | 5/1995 | Zehavi |
| 5,416,797 A | 5/1995 | Gilhousen et al. |
| 5,511,067 A | 4/1996 | Miller |
| 5,603,096 A | 2/1997 | Gilhousen et al. |
| 5,617,410 A | 4/1997 | Matsumoto |
| 5,751,761 A | 5/1998 | Gilhousen |
| 5,870,427 A | 2/1999 | Tiedemann et al. |
| 5,930,244 A | 7/1999 | Ariyoshi et al. |
| 5,937,019 A | 8/1999 | Padovani |
| 5,940,439 A | 8/1999 | Kleider et al. |
| 5,943,606 A | 8/1999 | Kremm et al. |
| 5,974,041 A | 10/1999 | Kornfeld et al. |
| 5,983,113 A | 11/1999 | Asanuma |
| 6,044,074 A | 3/2000 | Zehavi et al. |
| 6,085,108 A | 7/2000 | Knutsson et al. |
| 6,091,760 A | 7/2000 | Giallorenzi et al. |
| 6,094,421 A | 7/2000 | Scott |
| 6,097,715 A | 8/2000 | Ichihara |
| 6,141,374 A | 10/2000 | Burns |
| 6,144,651 A | 11/2000 | Rinchiuso et al. |
| 6,181,674 B1 | 1/2001 | Xin et al. |
| 6,181,919 B1 | 1/2001 | Ozluturk |
| 6,240,292 B1 | 5/2001 | Haberman et al. |
| 6,249,517 B1 | 6/2001 | Roh et al. |
| 6,259,927 B1 | 7/2001 | Butovitsch et al. |
| 6,266,363 B1 | 7/2001 | Hiramatsu |
| 6,324,160 B1 | 11/2001 | Martin et al. |
| 6,324,401 B1 | 11/2001 | De Hoz Garcia-Bellido et al. |
| 6,332,008 B1 | 12/2001 | Giallorenzi et al. |
| 6,377,814 B1 | 4/2002 | Bender |
| 6,396,867 B1 | 5/2002 | Tiedemann et al. |
| 6,421,334 B1 | 7/2002 | Baines |
| 6,438,377 B1 | 8/2002 | Savolainen |
| 6,456,612 B1 | 9/2002 | Kim et al. |
| 6,459,694 B1 | 10/2002 | Sari et al. |
| 6,463,074 B1 | 10/2002 | Johnson et al. |
| 6,470,001 B1 | 10/2002 | Kim et al. |
| 6,483,828 B1 | 11/2002 | Balachandran et al. |
| 6,493,376 B1 | 12/2002 | Harms et al. |
| 6,516,007 B1 | 2/2003 | Hong et al. |
| 6,529,741 B1 | 3/2003 | Tong et al. |
| 6,563,808 B1 | 5/2003 | Cox et al. |
| 6,574,211 B2 | 6/2003 | Padovani et al. |
| 6,590,889 B1 | 7/2003 | Preuss et al. |
| 6,621,804 B1 | 9/2003 | Holtzman et al. |
| 6,647,077 B1 | 11/2003 | Shan et al. |
| 6,665,287 B1 | 12/2003 | Katsura et al. |
| 6,671,266 B1 | 12/2003 | Moon et al. |
| 6,747,963 B1 | 6/2004 | Park et al. |
| 6,760,587 B2 | 7/2004 | Holtzman et al. |
| 6,778,507 B1 | 8/2004 | Jalali |
| RE38,603 E | 9/2004 | Kim et al. |
| 6,917,581 B2 | 7/2005 | Proctor, Jr. et al. |
| 7,006,428 B2 | 2/2006 | Proctor, Jr. et al. |
| 7,116,646 B1 | 10/2006 | Gustafson et al. |
| 7,254,124 B2 | 8/2007 | Refai |
| 7,272,163 B2 | 9/2007 | Hao et al. |
| 7,620,097 B2 | 11/2009 | Heidari et al. |
| 7,729,714 B2 | 6/2010 | Black et al. |
| 7,852,746 B2 | 12/2010 | Jalali |
| 8,284,819 B2 | 10/2012 | Hahm et al. |
| 8,285,318 B2 | 10/2012 | Chen et al. |
| 2001/0008542 A1 | 7/2001 | Wiebke et al. |
| 2002/0009068 A1 | 1/2002 | Proctor, Jr. et al. |
| 2002/0054611 A1 | 5/2002 | Seta |
| 2002/0064182 A1 | 5/2002 | Hoffmann |
| 2002/0071384 A1 | 6/2002 | Hall et al. |
| 2002/0080024 A1 | 6/2002 | Nelson, Jr. et al. |
| 2002/0086693 A1 | 7/2002 | Ahmad et al. |
| 2002/0122402 A1 | 9/2002 | Periyalwar |
| 2003/0002460 A1 | 1/2003 | English |
| 2003/0039235 A1 | 2/2003 | Odenwalder et al. |
| 2003/0081539 A1 | 5/2003 | Tong et al. |
| 2003/0128658 A1 | 7/2003 | Walton et al. |
| 2003/0214932 A1 | 11/2003 | Ariyoshi et al. |
| 2004/0151141 A1 | 8/2004 | Proctor et al. |
| 2004/0203991 A1 | 10/2004 | Chen et al. |
| 2004/0257975 A1 | 12/2004 | Proctor |
| 2005/0041726 A1 | 2/2005 | Rouphael et al. |
| 2005/0054366 A1 | 3/2005 | Chen et al. |
| 2005/0111397 A1 | 5/2005 | Attar et al. |
| 2005/0220051 A1 | 10/2005 | Lavean |
| 2006/0140157 A1 | 6/2006 | Proctor et al. |
| 2007/0076583 A1 | 4/2007 | Hadad |
| 2010/0322160 A1 | 12/2010 | Yeh et al. |

FOREIGN PATENT DOCUMENTS

| | | |
|---|---|---|
| JP | 10-028077 A | 1/1998 |
| JP | 10-056420 | 2/1998 |
| JP | 10-336074 | 12/1998 |
| JP | 11-275059 | 10/1999 |
| JP | 11-317693 | 11/1999 |
| JP | 11-317979 | 11/1999 |
| JP | 2000-278759 A | 10/2000 |
| JP | 2000-286784 A | 10/2000 |
| JP | 2001-016159 A | 1/2001 |
| JP | 2001-358638 A | 12/2001 |
| KR | 2000-40479 | 7/2000 |
| WO | 92/00639 | 1/1992 |
| WO | 99/01994 A2 | 1/1999 |
| WO | 00/30390 | 5/2000 |
| WO | 01/24411 A1 | 4/2001 |
| WO | 01/26246 | 4/2001 |
| WO | 01/33871 | 5/2001 |
| WO | 01/95521 A2 | 12/2001 |
| WO | 02/09320 | 1/2002 |
| WO | 2004/046893 A2 | 6/2004 |

OTHER PUBLICATIONS

Telecommunications Industry Association, "TIA/EIA Standard, Mobile Station-Base Station Compatibility Standard for Wideband Spread Spectrum Cellular Systems, TIA/EIA-95B (Upgrade and Revision of TIA/EIA-95A)," (Mar. 1999).

Third Generation Partnership Project 2, "Physical Layer Standard for CDMA2000 Spread Spectrum Systems," 3 GPP2 C.S0002-0 V 1.0 (Jul. 1999).

Wong, T., "Doubly Spread DS-CDMA for Efficient Cancellation," IEEE, Oct. 31, 1999, pp. 177-181.

Chen, "Simultaneous Multiple Packet Capture Based on SIR Levels and Arrival Delay Offsets in CDMA Packet Networks," IEEE Transactions on Vehicular Technology, vol. 51, Issue 6 (Nov. 2002).

Cheun, "Optimum Arrival-Time Distribution for Delay Capture in Spread-Spectrum Packet Radio Networks," IEEE Transactions on Vehicular Technology, vol. 46, Issue 4 (Nov. 1997).

Ericsson, "Updated text proposal for TR 25.896: Fast DCH Setup Mechanisms," TSG-RAN WG1 #31, R1-030210 (Feb. 18-21, 2003).

LG Electronics Inc., "On consideration of synchronization indicator for reduction in uplink synchronization time in Fast DCH Setup," TSG-RAN WG1 #32, R1-030495 (May 19-23, 2003).

(56) References Cited

OTHER PUBLICATIONS

Nee Van R D J: "Timing Aspects of Synchronous CDMA" IEEE International Symposium on Personal, Indoor and Mobile Radio Communications, 1994, pp. 439-443, XP000619815, * p. 439-p. 440**.
Soft Handoff and Power Control in IS-95 CDMA; CDMA 95.10; Chapter 10; p. 181, (Dec. 6, 1999).
Third Generation Partnership Project, "Technical Specification Group Radio Access Network; Physical channels and mapping of transport channels onto physical channels (FDD) (Release 1999)," 3GPP TS 25.211 V3.7.0 (Mar. 2001).
Third Generation Partnership Project, "Technical Specification Group Radio Access Network; Physical channels and mapping of transport channels onto physical channels (FDD) (Release 1999)," 3GPP TS 25.211 V3.11.0 (Jun. 2002).
Third Generation Partnership Project, "Technical Specification Group Radio Access Network; Physical channels and mapping of transport channels onto physical channels (FDD) (Release 4)," 3GPP TS 25.211 V4.1.0 (Jun. 2001).
Third Generation Partnership Project, "Technical Specification Group Radio Access Network; Physical channels and mapping of transport channels onto physical channels (FDD) (Release 4)," 3GPP TS 25.211 V4.5.0 (Jun. 2002).
Third Generation Partnership Project, "Technical Specification Group Radio Access Network; Physical channels and mapping of transport channels onto physical channels (FDD) (Release 5)," 3GPP TS 25.211 V5.1.0 (Jun. 2002).
Third Generation Partnership Project, "Technical Specification Group Radio Access Network; Spreading and modulation (FDD) (Release 1999)," 3GPP TS 25.213 V3.6.0 (Jun. 2001).
Third Generation Partnership Project, "Technical Specification Group Radio Access Network; Spreading and modulation (FDD) (Release 1999)," 3GPP TS 25.213 V3.8.0 (Jun. 2002).
Third Generation Partnership Project, "Technical Specification Group Radio Access Network; Spreading and modulation (FDD) (Release 4)," 3G TS 25.213 V4.1.0 (Jun. 2001).
Third Generation Partnership Project, "Technical Specification Group Radio Access Network; Spreading and modulation (FDD) (Release 4)," 3G TS 25.213 V4.3.0 (Jun. 2002).
Third Generation Partnership Project, "Technical Specification Group Radio Access Network; Spreading and modulation (FDD) (Release 5)," 3GPP TS 25.213 V5.1.0 (Jun. 2002).
Third Generation Partnership Project, "Technical Specification Group Radio Access Network; Physical layer procedures (FDD) (Release 1999)," 3GPP TS 25.214 V3.10.0 (Mar. 2002).
Third Generation Partnership Project, "Technical Specification Group Radio Access Network; Physical layer procedures (FDD) (Release 1999)," 3GPP TS 25.214 V3.7.0 (Jun. 2001).
Third Generation Partnership Project, "Technical Specification Group Radio Access Network; Physical layer procedures (FDD) (Release 4)," 3GPP TS 25.214 V4.1.0 (Jun. 2001).
Third Generation Partnership Project, "Technical Specification Group Radio Access Network; Physical layer procedures (FDD) (Release 4)," 3GPP TS 25.214 V4.4.0 (Mar. 2002).
Third Generation Partnership Project, "Technical Specification Group Radio Access Network; Physical layer procedures (FDD) (Release 5)," 3GPP TS 25.214 V5.1.0 (Jun. 2002).
Third Generation Partnership Project, "Technical Specification Group Radio Access Network; MAC protocol specification (Release 1999)," 3GPP TS 25.321 V3.8.0 (Jun. 2001).
Third Generation Partnership Project, "Technical Specification Group Radio Access Network; MAC protocol specification (Release 1999)," 3GPP TS 25.321 V3.12.0 (Jun. 2002).
Third Generation Partnership Project, "Technical Specification Group Radio Access Network; MAC protocol specification (Release 4)," 3GPP TS 25.321 V4.1.0 (Jun. 2001).
Third Generation Partnership Project, "Technical Specification Group Radio Access Network; MAC protocol specification (Release 4)," 3GPP TS 25.321 V4.5.0 (Jun. 2002).
Third Generation Partnership Project, "Technical Specification Group Radio Access Network; MAC protocol specification (Release 5)," 3GPP TS 25.321 V5.1.0 (Jun. 2002).
Third Generation Partnership Project, "Technical Specification Group Radio Access Network; Packet Data Convergence Protocol (PDCP) Specification (Release 1999)," 3GPP TS 25.323 V3.5.0 (Jun. 2001).
Third Generation Partnership Project, "Technical Specification Group Radio Access Network; Packet Data Convergence Protocol (PDCP) Specification (Release 1999)," 3GPP TS 25.323 V3.9.0 (Jun. 2002).
Third Generation Partnership Project, "Technical Specification Group Radio Access Network; Packet Data Convergence Protocol (PDCP) Specification (Release 4)," 3GPP TS 25.323 V4.1.0 (Jun. 2001).
Third Generation Partnership Project, "Technical Specification Group Radio Access Network; Packet Data Convergence Protocol (PDCP) Specification (Release 4)," 3GPP TS 25.323 V4.5.0 (Jun. 2002).
Third Generation Partnership Project, "Technical Specification Group Radio Access Network; Packet Data Convergence Protocol (PDCP) Specification (Release 5)," 3GPP TS 25.323 V5.1.0 (Jun. 2002).
Third Generation Partnership Project, "Technical Specification Group Radio Access Network; High Spee Downlink Packet Access (HSDPA); Overall description; Stage 2 (Release 5)," 3GPP TS 25.308 V5.2.0 (Mar. 2002).
Third Generation Partnership Project, "Technical Specification Group Radio Access Network; RRC Protocol Specification (Release 1999)," 3GPP TS 25.331 V3.7.0 (Jun. 2001).
Third Generation Partnership Project, "Technical Specification Group Radio Access Network; Radio Resource Control (RRC); Protocol Specification (Release 1999)," 3GPP TS 25.331 V3.11.0 (Jun. 2002).
Third Generation Partnership Project, "Technical Specification Group Radio Access Network; RRC Protocol Specification (Release 4)," 3GPP TS 25.331 V4.1.0 (Jun. 2001).
Third Generation Partnership Project, "Technical Specification Group Radio Access Network; Radio Resource Control (RRC); Protocol Specification (Release 4)," 3GPP TS 25.331 V4.5.0 (Jun. 2002).
Third Generation Partnership Project, "Technical Specification Group Radio Access Network; Radio Resource Control (RRC); Protocol Specification (Release 5)," 3GPP TS 25.331 V5.1.0 (Jun. 2002).
CDMA Development Group, "Standards Requirements Document for the Evolution of cdma2000 1x," Version 2.0 (May 30, 2000).
Third Generation Partnership Project 2, "High-Speed Data Enhancements for cdma2000 1x—Integrated Data and Voice—Stage 1 Requirements," 3GPP2 S.R0026, Version 1.0, Section 6.2.3 (Oct. 17, 2000).
Telecommunications Industry Association, "TIA/EIA Interim Standard, Mobile Station-Base Station compatibility Standard for Dual-Mode Wideband Spread Spectrum Cellular System, TIA/EIA/IS-95," (Jul. 1993).
Third Generation Partnership Project 2, "cdma2000 High Rate Packet Data Air Interface Specification," 3GPP2 C.S0024, Version 2.0 (Oct. 27, 2000).
Third Generation Partnership Project 2, "Medium Access Control (MAC) Standard for cdma2000 Spread Spectrum Systems," 3GPP2 C.S0003-0, Version 1.0 (Oct. 1999).
Third Generation Partnership Project 2, "Introduction to cdma2000 Standards for Spread Spectrum Systems," 3GPP2 C30001-0, Version 1.0 (Jul. 1999).
Third Generation Partnership Project 2, "Signaling Link Access Control (LAC) Standard for cdma2000 Spread Spectrum Systems," 3GPP2 C.S0004-0, Version 1.0 (Jul. 1999).
Third Generation Partnership Project 2, "Upper Layer (Layer 3) Signaling Standard for cdma2000 Spread Spectrum Systems," 3GPP2 C.S0005-0, Version 1.0 (Jul. 1999).

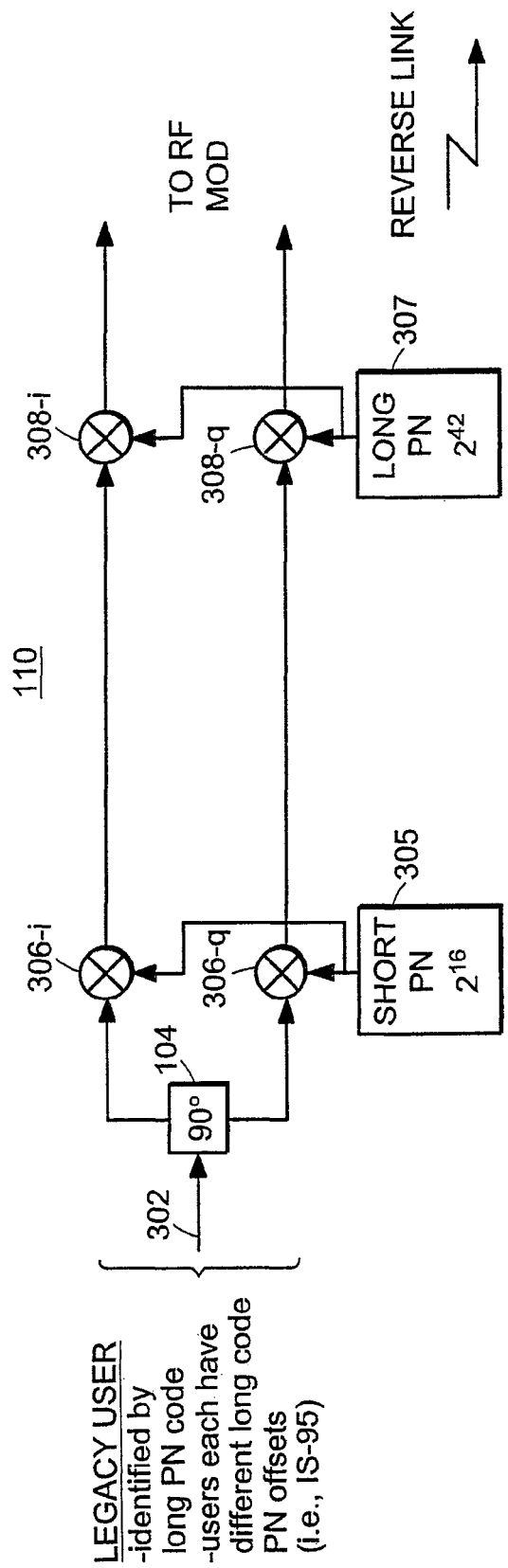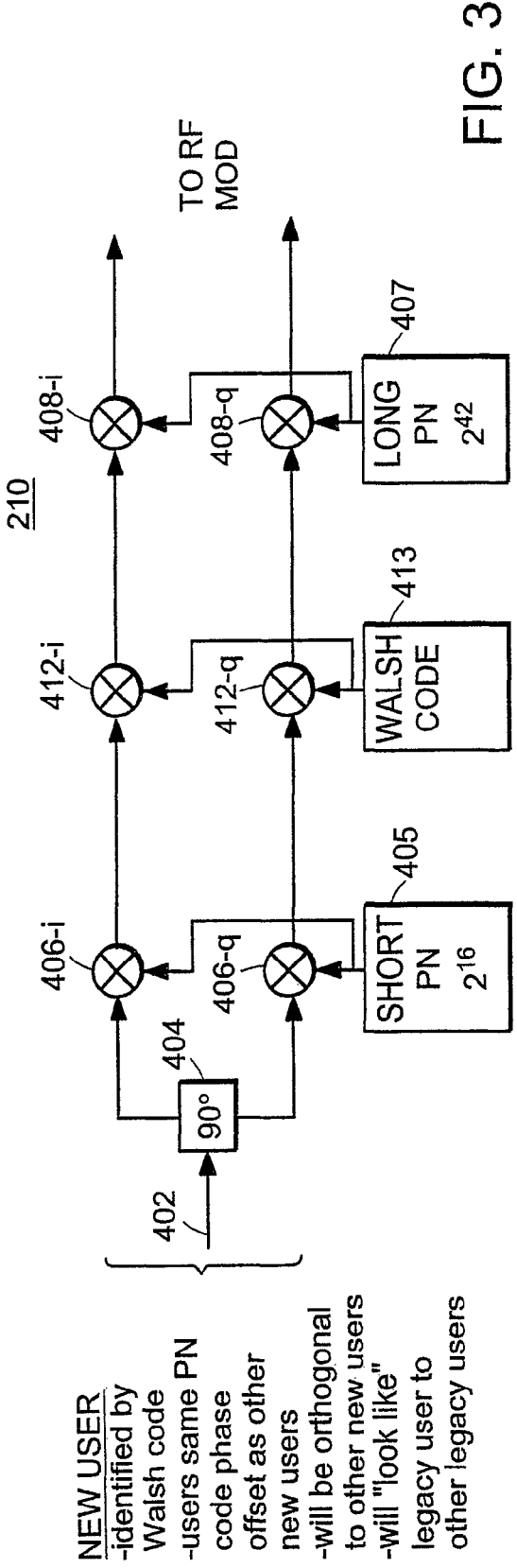

USE OF ORTHOGONAL OR NEAR ORTHOGONAL CODES IN REVERSE LINK

CROSS REFERENCE TO RELATED APPLICATIONS

This application is a continuation of U.S. application Ser. No. 12/433,309 filed Apr. 30, 2009, which issued as U.S. Pat. No. 8,259,744 on Sep. 4, 2012, which is a continuation of U.S. application Ser. No. 11/152,858 filed Jun. 14, 2005, which issued as U.S. Pat. No. 7,529,264 on May 5, 2009, which is a continuation of U.S. patent application Ser. No. 10/196,569 filed Jul. 15, 2002, which issued as U.S. Pat. No. 6,917,581 on Jul. 12, 2005, which claims the benefit of U.S. Provisional Application No. 60/306,062, filed Jul. 17, 2001, the entire teachings of which are incorporated herein by reference.

FIELD OF INVENTION

This application is related to wireless communications.

BACKGROUND

The last twenty years have seen unprecedented growth in both the type and demand for wireless communication services. Wireless voice communication services, including cellular telephone, Personal Communication Services (PCS), and similar systems now provide nearly ubiquitous coverage. The infrastructure for such networks has been build-out to the point where most residents of the United States, Europe, and other industrialized regions of the world have not just one, but multiple service providers from which to choose.

Continued growth in the electronics and computer industries increasingly contributes to demand for access to the Internet and the myriad of services and features that it provides. This proliferation in the use of computing equipment, especially that of the portable variety, including laptop computers, handheld Personal Digital Assistants (PDAs), Internet-enabled cellular telephones and like devices, has resulted in a corresponding increase in the need for wireless data access.

While the cellular telephone and PCS networks are widely deployed, these systems were not originally intended for carrying data traffic. Instead, these networks were designed to efficiently support continuous analog signals as compared to the burst mode digital communication protocols needed for Internet communications. Consider also that voice communication is adequate with a communication channel bandwidth of approximately 3 kilohertz (kHz). However, it is generally accepted that for effective Internet communication, such as for Web browsing, a data rate of at least 56 kilobits per second (kbps) or higher is required.

In addition, the very nature of the data traffic itself is different from the nature of voice communication. Voice requires a continuous duplex connection, that is, the user at one end of a connection expects to be able to transmit and receive to the user at the other end of a connection continuously, while at the same time the user at the other end is also able to transmit and receive. However, access to Web pages over the Internet is, in general, very burst oriented. Typically, the user of a remote client computer specifies the address of computer files such as on a Web server. This request is then formatted as a relatively short data message, typically less than 1000 bytes in length. The other end of the connection, such as at a Web server in the network, then replies with the requested data file which may be from 10 kilobytes to several megabytes of text, image, audio, or video data. Because of delays inherent in the Internet itself, users often expect delays of at least several seconds or more before the requested content begins to be delivered to them. And then once that content is delivered, the user may spend several seconds or even minutes reviewing, reading the contents of the page before specifying the next page to be downloaded.

Furthermore, voice networks were built to support high mobility usage; that is, extreme lengths were taken to support highway speed type mobility to maintain connections as the users of voice based cellular and PCS networks travel at high speeds along a highway. However, the typical user of a laptop computer is relatively stationary, such as sitting at a desk. Thus, the cell-to-cell high speed mobility considered critical for wireless voice networks is typically not required for supporting data access.

SUMMARY

A forward link of a CDMA (Code Division Multiple Access) communication system typically incorporates orthogonal codes to define channels for transmitting information from a single source to multiple receivers. For example, a base station can simultaneously transmit over multiple forward link channels defined by orthogonal codes because such transmissions over multiple channels can be precisely controlled so that the transmitted signals are orthogonal to each other. Generally, synchronization on the forward link is not an issue because a single source transmits multiple signals to multiple users.

In a reverse link, however, orthogonal codes are not used to transmit from a remote device to the base station because of the unique delay profile associated with each remote device for transmissions back to the base station. More specifically, a signal transmitted by another remote device farther away typically takes longer to reach the base station than a transmission by a remote device closer to the base station. Thus, orthogonality of channels can be lost when these signals are not received so that they are synchronized with respect to each other at the base station.

Current CDMA standards such as IS-2000 and IS-95 do not attempt to achieve orthogonality between separate remotely transmitting devices. Instead, the standards utilize a chip level scrambling code incorporating unique shifts in a long code to distinguish which of multiple reverse link access terminals is transmitting to the base station. According to this scheme, the channels can not be defined so that they are orthogonal with respect to each other.

One method for synchronizing reverse link channels is described in the related applications as mentioned above. Based on such methods, reverse link channels from multiple individual remote devices can be defined by orthogonal codes to support higher reverse link data rates. This is due to reasonably precise timing alignment between the field units and corresponding base station as a result of feedback messages. Accordingly, multiple channels defined by orthogonal codes can appear orthogonal to each other at the base station when transmissions from the remote devices are adjusted to account for their delay profile and corresponding multi-path distortion profile. Reverse channels can therefore be defined by scrambling each transmitted symbol with orthogonal sequences or codes such as Walsh codes.

One aspect of the present invention involves retrofitting certain components of the existing wireless infrastructure to more efficiently accommodate wireless data. The additional functionality implemented for a new class of users who are high data rate, but low mobility can be backwards compatible with existing functionality for users who are low data rate, high mobility. This would permit use of the same frequency allocation plans, base station antenna, build out sites, and other aspects of the existing voice network infrastructure to provide the new high speed data service.

It can be particularly advantageous to support as high a data rate as possible on the reverse link of such a network that is carrying data on the reverse link, e.g., from the remote unit to the base station. Consider that existing digital cellular standards such as the IS-95 Code Division Multiple Access (CDMA) specify the use of different code sequences in a forward link direction in order to maintain minimum interference between channels. Specifically, such a system employs orthogonal codes on the forward link, which defines individual logical channels. However, the optimum operation of such a system requires all such codes to be time aligned to a specific boundary to maintain orthogonality at the receiver.

This is not a particular concern in a forward link direction since all transmissions originate from the same location, i.e., from a base station location. However, currently, digital cellular CDMA standards do not attempt to use or require orthogonality between channels in reverse link direction. It is generally assumed that it is too difficult to synchronize transmissions originating from remote units located in different locations and at potentially quite different distances from the base station. Instead, these systems typically use a chip level scrambling code with unique shifts of this long pseudorandom code to distinguish the individual reverse link channels. Use of this scrambling code, however, precludes different users' transmissions being orthogonal to one another.

Another aspect of the present invention is a system supporting communication among members of a first group of users and a second group of users. The first group of users, which may be legacy users of a digital Code Division Multiple Access (CDMA) cellular telephone system, can encode their transmissions with a common first code. Such first group of users are uniquely identifiable by providing a unique code phase offset for each user. The second group of users, who may be users of a high speed data service, can encode their transmissions using the same code and one of the code phase offsets of that code. That is, a unique phase shifted long code can be used for spreading. Each of the users of the second group can further encode their transmissions with an additional code. This additional code can be unique for each of the users of the second group. This permits the transmissions of the second group of users to be orthogonal to each other while maintaining the appearance of collectively being a single user of the first group.

A chip rate at which the orthogonal code is applied to define a channel can be equal to a chip rate at which the unique phase shifted long code is applied.

In other applications, however, it can be advantageous to apply the orthogonal code at a lower chipping rate than that of the unique phase shifted long code. To increase a bit rate, higher order modulation techniques can be employed. For example, QPSK, 8-psk, 16-psk and higher order modulation can be used to transmit data information.

In a specific application, adaptive modulation techniques can be used to transmit data information. For example, a modulation rate can be selected to optimize data throughput of the system.

The code assigned to the first group of users may be a common chipping rate, pseudorandom code. The code assigned to the second group of terminals may be a set of unique orthogonal codes such as Walsh codes. The individual members of the first group of terminals may be distinguished by scrambling codes that have unique phase offsets of a selected longer pseudorandom noise sequence.

Certain steps can be taken to ensure proper operation of the signaling among the second group of users or so-called "heartbeat." Specifically, a common code channel may be dedicated for use as a synchronization channel. This permits the maintenance of proper timing of the transmissions of the second group of terminals if, for example, the coding scheme is implemented in a reverse link direction. In other words, a feedback loop can be established for each of multiple remote devices so that their simultaneous transmissions are synchronously received at the base station. A message in the Feedback channel to a particular field unit can indicate whether to advance or retard its timing for future communications so they are received at the proper time at base station.

Users of the second group can be allocated specific time slots in which to transmit and therefore maintain the orthogonality through the use of time division multiple access. Again, the second group of users can collectively appear as a single user to the transmissions of the users in the first group.

Another aspect of the present invention involves providing a CDMA communication system in which user channels in the reverse link are defined by orthogonal codes and the system does not include legacy users. In such a system, it would not be necessary to address backwards compatibility issues associated with legacy users.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a more detailed diagram of a channel encoding process for a first class of users according to certain principles of the present invention.

FIG. 3 is a more detailed diagram of a channel encoding process for a second class of users according to certain principles of the present invention.

DETAILED DESCRIPTION

Figure 1:
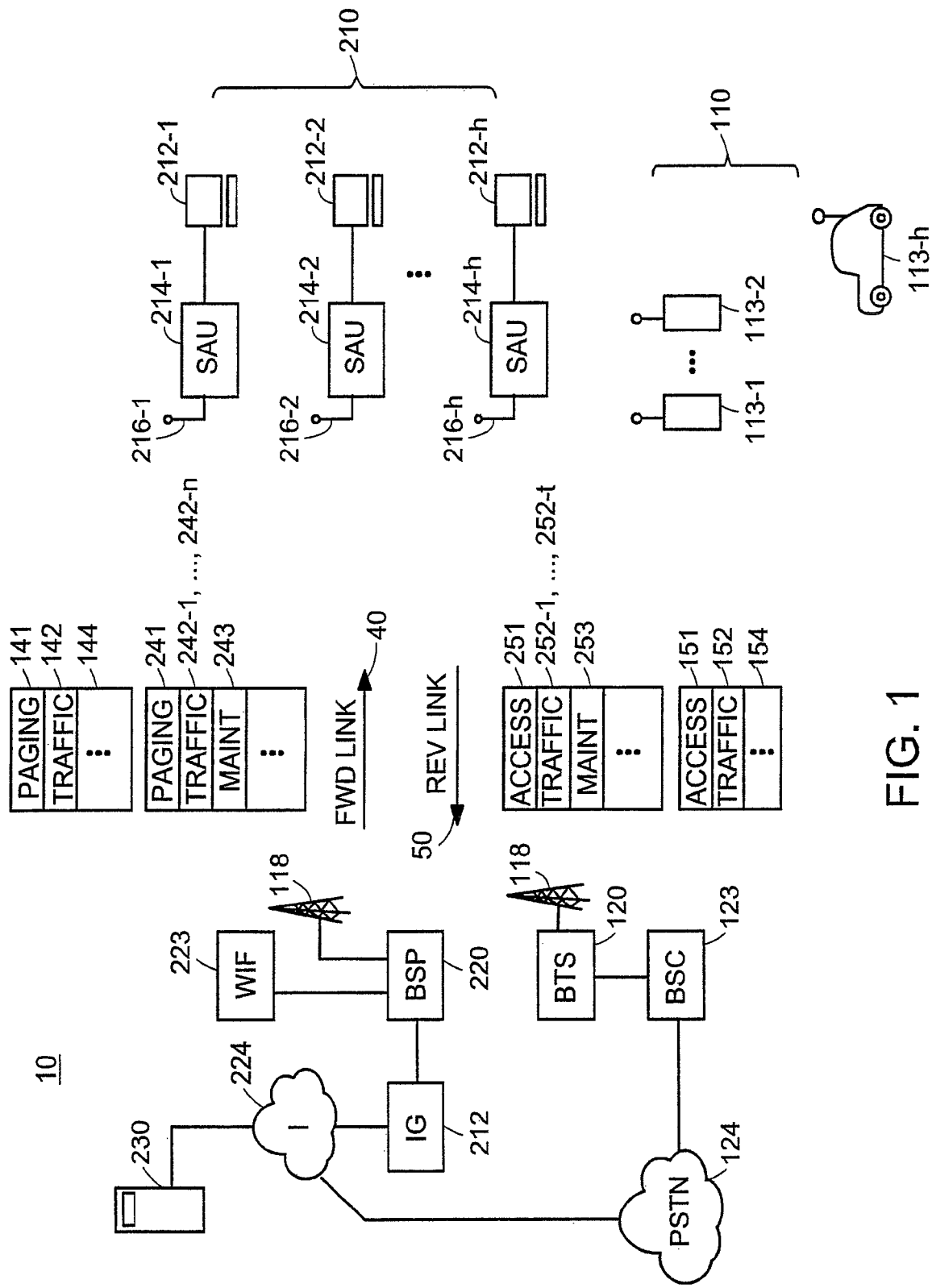
FIG. 1 is a block diagram of a system that employs two different types of channel encoding according to certain principles of the invention.

FIG. 1 is a block diagram of a Code Division Multiple Access (CDMA) communication system 10 that makes use of a signal encoding scheme in which a first class of logical channels are assigned unique long codes with different code phase offsets, and a second class of logical channels are provided by using a common code and common code phase offset, combined with an additional coding process using a unique orthogonal code for each channel. In one embodiment, however, communication system 10 does not include legacy users.

In the following detailed description of a preferred embodiment, the communication system 10 is described such that the shared channel resource is a wireless or radio channel. However, it should be understood that the techniques described here can be applied to implement shared access to other types of media such as telephone connections, computer network connections, cable connections, and other physical media to which access is granted on a demand driven basis.

The system 10 supports wireless communication for a first group of users 110 as well as a second group of users 210. The first group of users 110 are typically legacy users of cellular telephone equipment such as wireless handsets 113-1, 113-2, and/or cellular mobile telephones 113-$h$ installed in vehicles. This first group of users 110 principally use the network in a voice mode whereby their communications are encoded as continuous transmissions. In a preferred embodiment, these users' transmissions are forwarded from the subscriber units 113 through forward link 40 radio channels and reverse link 50 radio channels. Their signals are managed at a central location that includes a base station antenna 118, base transceiver station (BTS) 120, base station controller (BSC) 123. The first group of users 110 are therefore typically engaged in voice conversations using the mobile subscriber units 113, BTS 120, and BSC 123 to connect telephone connections through the Public Switch Telephone Network (PSTN) 124.

The forward link 40 in use by the first group of users may be encoded according to well known digital cellular standards such as this Code Division Multiple Access (CDMA) standard defined in IS-95B specified by the Telecommunications Industry Association (TIA). This forward link 40 includes at least a paging channel 141 and traffic channel 142, as well as other logical channels 144. These forward link 40 legacy channels 141, 142, 144 are defined in such a system by using orthogonally coded channels. These first group of users 110 also encode their transmissions over the reverse link 50 in accordance with the IS-95B standard. They therefore make use of several logical channels in a reverse link 50 direction, including an access channel 151, traffic channel 152, and other logical channels 154. In this reverse link 50, the first group of users 110 typically encode the signals with a common long code using different code phase offsets. The manner of encoding signals for the legacy users 110 on the reverse link 50 is also well known in the art.

The communication system 10 also includes a second group of users 210. This second group of users 210 are typically users who require high speed wireless data services. Their system components include a number of remotely located Personal Computer (PC) devices 212-1, 212-2, . . . 212-$h$, . . . 212-$l$, corresponding remote Subscriber Access Units (SAUs) 214-1, 214-2, . . . 214-$h$, . . . 214-$l$, and associated antennas 216-1, 216-2, . . . 216-$h$, . . . 216-$l$. Centrally located equipment includes a base station antenna 218, and a Base Station Processor (BSP) 220. The BSP 220 provides connections to an from an Internet gateway 222, which in turn provides access to a data network such as the Internet 224, and network file server 230 connected to the network 222.

The PCs 212 may transmit data to and receive data from network server 230 through bi-directional wireless connections implemented over the forward link 40 and reverse link 50 used by the legacy users 110. It should be understood that in a point to multi-point multiple access wireless communication system 10 as shown, a given base station processor 220 supports communication with a number of different active subscriber access units 214 in a manner which is similar to a cellular telephone communication network.

In the present scenario, the radio frequencies allocated for use by the first group 110 are the same as those allocated for use by the second group 210. The present invention is specifically concerned with how to permit a different encoding structure to be used by the second group 210 while creating minimal interference to the first group 110.

The PCs 212 are typically laptop computers 212-$l$, hand-held units 212-$h$, Internet-enabled cellular telephones or Personal Digital Assistant (PDA) type computing devices. The PCs 212 are each connected to a respective SAU 214 through a suitable wired connection such as an Ethernet-type connection.

An SAU 214 permits its associated PC 212 to be connected to the network file server 230 through the BSP 220, gateway 222 and network 224. In the reverse link direction, that is, for data traffic traveling from the PC 212 towards the server 230, the PC 212 provides an Internet Protocol (IP) level packet to the SAU 214. The SAU 214 then encapsulates the wired framing (i.e., Ethernet framing) with appropriate wireless connection framing and encoding. The appropriately formatted wireless data packet then travels over one of the radio channels that comprise the reverse link 50 through the antennas 216 and 218. At the central base station location, the BSP 220 then extracts the radio link framing, reformatting the packet in IP form and forwards it through the Internet gateway 222. The packet is then routed through any number and/or any type of TCP/IP networks, such as the Internet 224, to its ultimate destination, such as the network file server 230.

Data may also be transmitted from the network file server 230 to the PCs 212 in a forward link 40 direction. In this instance, an Internet Protocol (IP) packet originating at the file server 230 travels through the Internet 224 through the Internet gateway 222 arriving at the BSP 220. Appropriate wireless protocol framing and encoding is then added to the IP packet. The packet then travels through the antenna 218 and 216 to the intended receiver SAU 214. The receiving SAU 214 decodes the wireless packet formatting, and forwards the packet to the intended PC 212 which performs the IP layer processing.

A given PC 212 and the file server 230 can therefore be viewed as the end points of a duplex connection at the IP level. Once a connection is established, a user at the PC 212 may therefore transmit data to and receive data from the file server 230.

From the perspective of the second group of users 210, the reverse link 50 actually consists of a number of different types of logical and/or physical radio channels including an access channel 251, multiple traffic channels 252-1, . . . 252-$t$, and a maintenance channel 53. The reverse link access channel 251 is used by the SAUs 240 to send messages to the BSP 220 to request that traffic channels be granted to them. The assigned traffic channels 252 then carry payload data from the SAU 214 to the BSP 220. It should be understood that a given IP layer connection may actually have more than one traffic channel 252 assigned to it. In addition, a maintenance channel 253 may carry information such as synchronization and power control messages to further support transmission of information over the reverse link 50.

Similarly, the second group of users have a forward link 40 that includes a paging channel 241, multiple traffic channels 242-1 . . . 242-$t$, and maintenance channel 243. The paging channel 241 is used by the BSP 220 to not only inform the SAU 214 that forward link traffic channels 252 have been allocated to it, but also to inform the SAU 214 of allocated traffic channels 252 in the reverse link direction. Traffic channels 242-1 . . . 242-t on the forward link 40 are then used to carry payload data information from the BSP 220 to the SAUs 214. Additionally, maintenance channels 243 carry synchronization and power control information on the forward link 40 from the base station processor 220 to the SAUs 214. It should be understood that there are typically many more traffic channels 241 than paging channels 241 or maintenance channels 243. In the preferred embodiment, the logical forward link channels 241, 242, and 243 and 251, 252, and 253 are defined by assigning each channel a pseudorandom noise (PN) channel code. The system 10 is therefore a so-called Code Division Multiple Access (CDMA) system in which multiple coded channels may use the same radio frequency (RF) channel. The logical or codes channels may also be further divided or assigned among multiple active SAUs 214.

The sequence of signal processing operations is typically performed to encode the respective reverse link 50 logical channels 51, 52, and 53. In the reverse link direction, the transmitter is one of the SAUs 214 and the receiver is the Base Station Processor (BSP) 220. The preferred embodiment of the invention is implemented in an environment where legacy users of a CDMA digital cellular telephone system such as one operating in accordance with the IS-95B standard are also present on the reverse link 50. In an IS-95B system, reverse link CDMA channel signals are identified by assigning non-orthogonal pseudorandom noise (PN) codes.

Turning attention now to FIG. 2, the channel encoding process for the first group of legacy users 110 will be described in greater detail. This first class of users includes, for example, digital CDMA cellular telephone system users that encode signals according to the IS-95B standard as mentioned above. The individual channels are therefore identified by modulating the input digitized voice signal by a pseudorandom noise (PN) code sequence for each channel. Specifically, the channel encoding process takes an input digital signal 302 that represents the information to be transmitted. A quadrature modulator 304 provides an in-phase (i) and quadrature (q) signal path to a pair of multipliers 306-i and 306-q. A short pseudorandom noise (PN) code generator 305 provides a short (in this case a $2^{15}-1$ or 32767 bit) length code used for spectrum spreading purposes. The short code typically therefore is the same code for each of the logical channels for the first group 110.

A second code modulation step is applied to the (i) and (q) signal paths by multiplying the two signal paths with an additional long PN code. This is accomplished by the long code generator 307 and the long code multipliers 308-i and 308-q. The long code serves to uniquely identify each user on the reverse link 50. The long code may be a very long code, which, for example, only repeats every $2^{42}-1$ bits. The long code is applied at the short code chipping rate, e.g., one bit of the long code is applied to each bit output by the short code modulation process, so that further spectrum spreading does not occur.

Individual users are identified by applying different phase offsets of the PN long code to each user.

It should be understood that other synchronization steps need not be taken for the first group of users 110. Specifically, these transmissions on the reverse link 50 are designed to be asynchronous and therefore are not necessarily perfectly orthogonal.

FIG. 3 is a more detailed view of the channel encoding process for the second group of users 210. This second group 210, for example, includes wireless data users that encode signals according to a format optimized for data transmission.

The individual channels are identified by modulating the input data by a pseudorandom noise (PN) code sequence that is the same code sequence used for the first group of users 110. However, as will be understood shortly, the channels in the second group 210 are uniquely identified by specific orthogonal codes such as Walsh codes. Specifically, the channel encoding process for this second group of users 210 takes an input digital signal 402 and applies a number of codes as generated by a short code generator 405, Walsh code generator 413, and long code generator 407.

As a first step, a quadrature modulator 404 provides an in-phase (i) and quadrature (q) signal path to a first pair of multipliers 406-i and 406-q. The short pseudorandom noise (PN) code generator 405 provides a short, in this case, a $2^{15}$ length code used for spectrum spreading purposes. This short code therefore is the same as the short PN code used for each of the channels in the first group 110.

A second step in the process is to apply an orthogonal code such as generated by the Walsh code generator 413. This is accomplished by the multipliers 412-i and 412-q impressing the orthogonal code on each of the in-phase and quadrature signal paths. The orthogonal code assigned to each logical channel is different, and uniquely identifies such channels.

In a final step of the process, a second pseudorandom noise (PN) long code is applied to the (i) and (q) signal paths. The long code generator 407 thus forwards the long code to a respective one of the in-phase 408-i and quadrature 408-q multipliers. This long code does not uniquely identify each user in the second group 210. Specifically, this code may be one of the very same long codes that are used in the first group that uniquely identify their first group of users 110. Thus, for example, it is applied in the same manner as a short code chipping rate code so that one bit of the long code is applied to each bit output by the short code modulation process. In this manner, all of the users in the second group 210 appears as a single legacy user of the first group 110. However, the users of the second group 210 may be uniquely identified given that they have been assigned unique orthogonal Walsh codes.

As the implementation in the preferred embodiment is on a reverse link 50, additional information must be provided in order to maintain orthogonality among the various users in the second group 210. Specifically, a maintenance channel 243 is therefore included in the forward link 40. This maintenance or "heartbeat" channel provides synchronization information and/or other timing signals so that the remote units 214 may synchronize their transmissions appropriately. The maintenance channel may be time slotted. For more details of the formatting of this forward link maintenance channel 243, reference can be made to U.S. Pat. No. 7,079,523 which issued on Jul. 18, 2006 entitled "MAINTENANCE LINK USING ACTIVE/STANDBY REQUEST CHANNELS," which is hereby incorporated by reference in its entirety. This application is related to U.S. application Ser. No. 09/778,474, filed on Feb. 7, 2001 and U.S. Pat. No. 7,079,523 which issued on Jul. 18, 2006, the teachings of which are also incorporated herein by reference.

It should be understood that certain infrastructure may therefore be shared by both the second group of users 210 and first group of users 110. For example, the antennas 218 and 118 although shown as separate base station antennas in FIG. 1 may indeed be a shared antenna. Likewise, the location for the antennas may therefore be the same. This permits the second group of users 210 to share equipment and physical build-out locations already in place and in use by the legacy users 110. This greatly simplifies the deployment of wireless infrastructure for this new group of users 210, for example, new locations and new antenna sites need not be built out.

Figure 4:
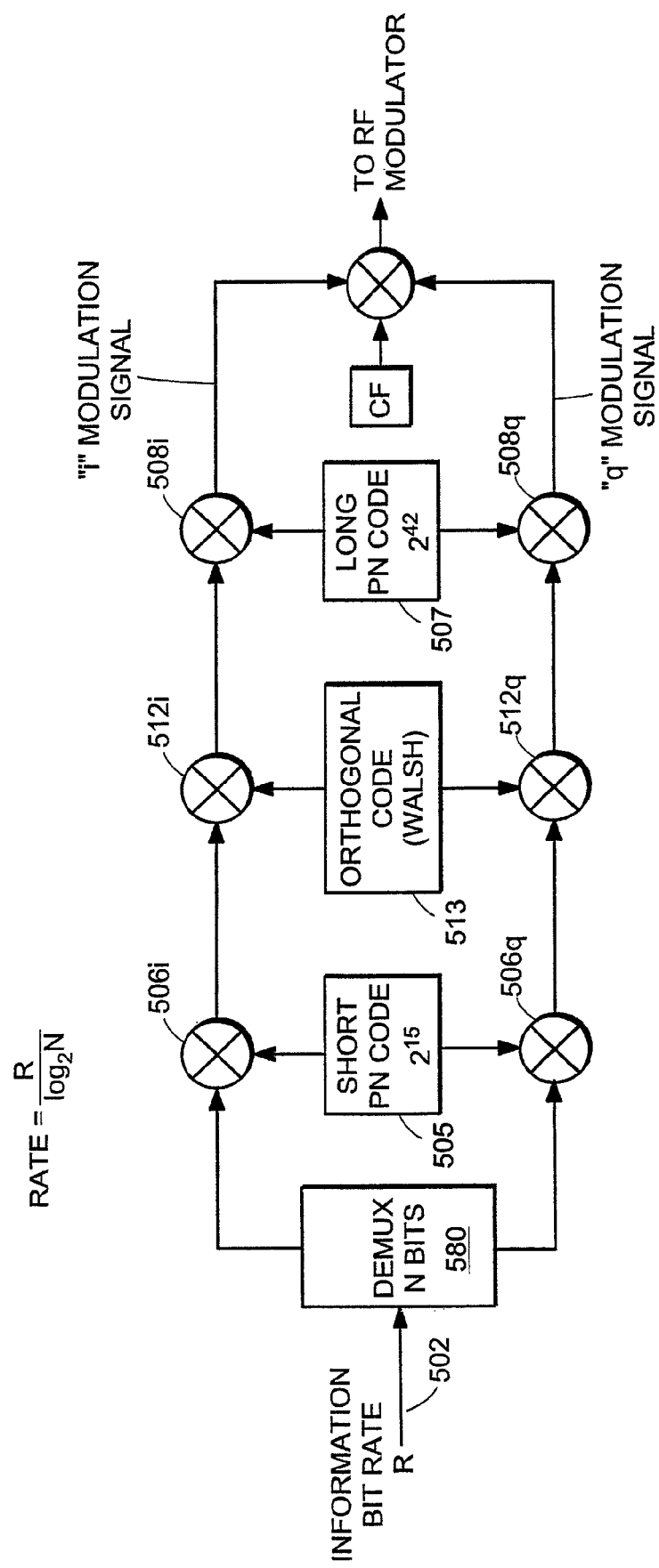
FIG. 4 is a block diagram of a channel spreading process for transmitting from a remote device to a base station according to certain principles of the present invention.

FIG. 4 is a block diagram illustrating a communication system according to certain principles of the present invention. As previously discussed, such a system may or may not include legacy users. Generally, the principles are similar to those as discussed in FIG. 3.

As shown in FIG. 4, bit information 502 is fed into demultiplexer/modulator 580 where the bits are demultiplexed into modulation symbols to generate an I and Q modulation signal. Generally, N bits are mapped based upon the order of modulation applied. For example, the following chart illustrates different modulation rates that can be used for transmitting information over an RF signal:

| Order N | Input Rate R | Bits/Symbol | Output Rate |
|---------|--------------|-------------|-------------|
| BPSK - (2) | R | 1 | R |
| QPSK - (4) | R | 2 | R/2 |
| 8-PSK - (8) | R | 3 | R/3 |
| 16-QAM (16) | R | 4 | R/4 |
| . | . | . | . |
| . | . | . | . |
| . | . | . | . |

According to the spreading process, the Output Rate = R/(log$_2$N).

The individual channels are identified by modulating the input data by a pseudorandom noise (PN) code sequence such as a short code and long code. However, as will be understood shortly, the channels can be uniquely identified by specific orthogonal codes such as Walsh codes. Near orthogonal codes also can be used to define channels.

Specifically, a channel encoding process can involve demultiplexing a digital signal 502 and applying a number of codes as generated by short code generator 505, Walsh code generator 513, and long code generator 507. Generally, these spreading techniques can be applied in any order although a specific order is shown in FIG. 4.

As a first step, modulator 580 provides an in-phase (i) and quadrature (q) signal path to a first pair of multipliers 506-*i* and 506-*q*. Short pseudorandom noise (PN) code generator 505 provides a short code, in this case, a $2^{15}$ length code used for spectrum spreading purposes. This short code can be used for each of multiple channels.

A second step in the process is to apply an orthogonal code such as generated by the Walsh code generator 513. This can be accomplished by multipliers 512-*i* and 512-*q* impressing an orthogonal code on each of the in-phase and quadrature signal paths. An orthogonal code assigned to each logical channel can be different to uniquely identify separate channels.

In a final step of the process, a second pseudorandom noise (PN) long code can be applied to the (i) and (q) signal paths. Long code generator 507 thus forwards the long code to a respective one of the in-phase 508-*i* and quadrature 508-*q* multipliers. Typically, this long code does not uniquely identify each channel.

Depending on the application, the order of spreading can vary. For example, the spreading codes such as the short and long codes can be applied sequentially and in any order. Typically, the code rate is set at the RF (Radio Frequency) bandwidth such as 1.2288 e+6 chips per second.

Although the chipping rate of the codes may vary, in one application the chipping rate of the orthogonal code is less than the chipping rate of the short or long PN spreading code. This relaxes timing alignment requirements of the communication system and reduces the negative impact of multi-path distortion associated with each of multiple users transmitting over channels defined by orthogonal codes. In other words, Orthogonal Channel Noise (OCN) can be reduced by adjusting relative rates of the spreading code and orthogonal codes to each other.

Typically, lower chipping rates of the orthogonal code will reduce a data transmission rate for a channel. However, higher order modulation can be utilized to increase the data rate as previously discussed. See the chart above. Adaptive modulation techniques can be employed to optimally transmit for a particular application. In other words, feedback information can indicate an optimal rate at which data will be transmitted on a particular channel. Thus, an optimal modulation rate can be selected for transmitting over a particular channel. When higher throughput is necessary, increased bit rates can be achieved using higher modulation rates. This is particularly advantageous in dynamic environments where users require high speed data throughput capability. Each of multiple orthogonal channels can utilize different modulation rates for transmitting data.

Although the previously discussed concepts are discussed for use in a reverse link, they also can be advantageously applied to forward link channels of a CDMA communication system.

Generally, the choice of an orthogonal code rate is independent of the choice of the order of modulation used. The following chart illustrates potential settings for relative code rates:

| Spreading Code Rate | Orthogonal Code Rate | Symbol Rate |
|---------------------|----------------------|-------------|
| R = 1.2288 e6 | R | R |
| R | R/2 | R/2 |
| R | R/3 | R/3 |
| R | R/4 | R/4 |

Terminal devices transmitting data over one or multiple channels defined by orthogonal codes can also utilize Forward Error Correction (FEC) codes to ensure data reliability at a receiver. Similar to the adaptive modulation techniques as discussed, an FEC codes can be adapted for use in a particular channel. That is, an FEC code rate or modulation rate can be selected based on a C/I measured for a particular channel at a receiver such as a base station. Feedback messages can be transmitted from the base station to a remote device regarding how to set a modulation rate and which of multiple FEC codes shall be used for transmitting over a particular channel.

What is claimed is:

1. A wireless network device comprising:
   circuitry configured to receive signals and recover data from a first plurality of subscriber units in a time interval including at least one time slot; and
   circuitry configured to receive signals and recover data from a second plurality of subscriber units in the time interval;
   wherein the received signal from each of the first plurality of subscriber units comprises a pseudo noise (PN) sequence that is different from a PN sequence of others of the first plurality of subscriber units;

wherein the received signal from each of the second plurality of subscriber units comprises an orthogonal sequence that is different from an orthogonal sequence of others of the second plurality of subscriber units, the received signal from each of the second plurality of subscriber units having a same PN sequence as the others of the second plurality of subscriber units; and wherein received signals from the second plurality of subscriber units comprise an orthogonal sequence which is not present in the received signals from the first plurality of subscriber units; and the wireless network device further comprising circuitry configured to transmit to each subscriber unit of the second plurality of subscriber units configuration information for use by that subscriber unit in determining the different orthogonal sequence of that subscriber unit.

2. The wireless network device of claim 1, wherein the circuitry is further configured to send each subscriber unit of the first plurality of subscriber units configuration information for use by that subscriber unit in determining the different PN sequence of that subscriber unit.

3. The wireless network device of claim 1, wherein the circuitry is further configured to send at least each subscriber unit of the second plurality of subscriber units timing adjustment information.

4. The wireless network device of claim 1, wherein the detected orthogonal sequence has a chipping rate less than the PN sequence.

5. A method comprising:
receiving signals and recovering data, by a wireless network device, from a first plurality of subscriber units and a second plurality of subscriber units in a time interval including at least one time slot;

wherein the received signal from each of the first plurality of subscriber units comprises a pseudo noise (PN) sequence that is different from a PN sequence of others of the first plurality of subscriber units;

wherein the received signal from each of the second plurality of subscriber units comprises an orthogonal sequence different from an orthogonal sequence of others of the second plurality of subscriber units, the received signal from each of the second plurality of subscriber units having a same PN sequence as the others of the second plurality of subscriber units; and wherein received signals from the second plurality of subscriber units comprise an orthogonal sequence which is not present in the received signals from the first plurality of subscriber units; and sending, by the network device, to each subscriber unit of the second plurality of subscriber units, configuration information for use by that subscriber unit in determining the different orthogonal sequence of that subscriber unit.

6. The method of claim 5, further comprising sending, by the network device, to each subscriber unit of the first plurality of subscriber units configuration information for use by that subscriber unit in determining the different PN sequence of that subscriber unit.

7. The method of claim 5 further comprising sending, by the network device, to at least each subscriber unit of the second plurality of subscriber units timing adjustment information.

8. The method of claim 5, wherein the detected orthogonal sequence has a chipping rate less than the PN sequence.

9. A method performed by a subscriber unit for communicating with a network device, wherein the network device is in communication with a first plurality of subscriber units each associated with a pseudo noise (PN) sequence that is different from a PN sequence associated with others of the first plurality of subscriber units, and a second plurality of subscriber units each associated with a common pseudo noise sequence and an orthogonal code that is different from an orthogonal code of others of the second plurality of subscriber units, the method comprising:

transmitting by the subscriber unit a wireless signal in a time interval which includes at least one time slot; and receiving configuration information for determining the different PN sequence;

wherein the subscriber unit is one of the first plurality of subscriber units;

wherein the wireless signal is generated using a pseudo noise (PN) sequence that is different from the PN sequences of other subscriber units of the first plurality of subscriber units.

10. The method of claim 9, further comprising receiving timing adjustment information.

11. The method of claim 9, wherein the orthogonal sequence has a chipping rate less than the PN sequence.

12. A method performed by a subscriber unit for communicating with a network device, wherein the network device is in communication with a first plurality of subscriber units each associated with a pseudo noise (PN) sequence that is different from a PN sequence of others of the first plurality of subscriber units, and a second plurality of subscriber units each associated with a common pseudo noise sequence and an orthogonal code that is different from an orthogonal code of others of the second plurality of subscriber units, the method comprising:

transmitting by the subscriber unit a wireless signal in a time interval which includes at least one time slot; and receiving configuration information for determining the different orthogonal sequence;

wherein the subscriber unit is one of the second plurality of subscriber units;

wherein the wireless signal is generated using an orthogonal sequence that is different from an orthogonal sequence of others of the second plurality of subscriber units and a pseudo noise (PN) sequence that is the same as the PN sequences of other subscriber units of the second plurality of subscriber units.

13. The method of claim 12, further comprising receiving timing adjustment information.

14. The method of claim 12, wherein the orthogonal sequence has a chipping rate less than the PN sequence.

* * * * *